United States Patent [19]

Fushiya et al.

[11] Patent Number: 4,934,494

[45] Date of Patent: Jun. 19, 1990

[54] COMBINED LOCKING MECHANISM AND SWITCH ESPECIALLY FOR POWER TOOLS

[75] Inventors: Fusao Fushiya; Akiharu Hayashi; Michio Okumura; Yukimi Amano, all of Anjo; Yasumichi Fukuma, Hirata; Shinya Hamazaki, Kameyama, all of Japan

[73] Assignees: Makita Electric Works, Ltd., Anjo; Omron Tateisi Electronics Co., Kyoto, both of Japan

[21] Appl. No.: 328,324

[22] Filed: Mar. 24, 1989

[30] Foreign Application Priority Data

Mar. 30, 1988 [JP] Japan .................................. 63-77017
Mar. 30, 1988 [JP] Japan .................................. 63-77207
Mar. 30, 1988 [JP] Japan .................................. 63-77208
Mar. 30, 1988 [JP] Japan .................................. 63-77209

[51] Int. Cl.[5] .............................................. F16D 23/00

[52] U.S. Cl. .............................. 192/0.034; 192/56 R; 200/522; 464/36

[58] Field of Search .................. 192/0.034, 56 R, 150; 81/473, 474, 475, 476; 200/522, 324, 325; 318/434; 464/36, 38, 39

[56] References Cited

U.S. PATENT DOCUMENTS 4,556,831 12/1985 Sakamoto ......................... 192/0.034
4,756,216 7/1988 Lo ........................................ 81/473

FOREIGN PATENT DOCUMENTS 571476 6/1958 Italy .................................... 192/150

*Primary Examiner*—Rodney H. Bonck
*Assistant Examiner*—Andrea Pitts
*Attorney, Agent, or Firm*—Dennison, Meserole, Pollack & Scheiner

[57] ABSTRACT

A combined locking mechanism and switch especially for power tools has a switch, an actuator for directly turning on or off the switch, a locking member shiftable between a first position in which it is disposed in opposed relation to the actuator and a second position in which it is spaced apart form the actuator, and an actuating member for actuating the actuator through the locking member only when the locking member is placed in the first position.

8 Claims, 13 Drawing Sheets

COMBINED LOCKING MECHANISM AND SWITCH ESPECIALLY FOR POWER TOOLS

BACKGROUND OF THE INVENTION

Some types of power tools such as electric screwdrivers, electric drills, electric circular saws and electric jigsaws incorporate a mechanism which is adapted to forcibly turn off a power switch for an electric motor when overload is imposed on a driver bit, drill bit or the like to produce excessive torque between the bit or the like and the output shaft of the electric motor.

Such a mechanism must meet the following requirements. First, the mechanism is required to forcibly turn off the power switch of the motor on the occurrence of overload, even if an operating member or lever is held in such a position as to rotate the motor. Preferably, when the power switch is turned off, the mechanism simultaneously produces dynamic braking force, for example, by forming a short circuit across armature coils.

Secondly, the mechanism must be so designed that when the operating member or level is once shifted to its inoperative position and then returned to its operative position, the power switch of the motor may be turned on by means of the operating lever shifted to the operative position.

The conventional mechanism of this type includes a circuit shown in FIG. 21. The circuit has two switches 1 and 3 connected between a power source 2 and a motor 4. The switch 1 is a starting switch for the motor adapted to be changed over in direct association with operation of the operating lever. The switch 1 has a contact c which is connected to a contact a and disconnected from the other contact b, when the operating lever is in its operative position. On the other hand, when the operating lever is in its operative position, the contact c is disconnected from the contact a and connected to the contact b. The switch 3 is a locking switch adapted to be changed over in operative association with an overload sensing mechanism (not shown). The switch 3 has a contact f which is, with no overload sensed, connected to a contact d and disconnected from the other contact e. On the other hand, when overload is sensed, the contact f is disconnected from the contact d and connected to the contact e.

When the operating lever is shifted to the operative position, with no overload sensed, driving current is supplied to the motor 4 through the connection of the contacts a–c and d–f. Then, if overload is sensed, the contact f is disconnected from the contact d to shut off supply of the driving current and, at the same time, the contact f is connected to the contact e to produce a dynamic braking force to be applied to the motor 4. At this time, even if the operating lever is held in the operative position, the above operation is achieved.

The locking switch 3 may be of the type in which when overload is sensed by the overload sensing mechanism, the contact f is disconnected from the contact d, and when the operating lever is shifted to the inoperative position, the contact f is brought into contact with the contact d. In this case, if the operating lever is once shifted to the inoperative position and then returned to the operative position, driving current is supplied to the motor 4 to rotate the same.

Thus, the conventional power tool having an overload cutoff feature includes two switches, that is, a starting switch (switch 1 in FIG. 21) for rotating the motor and a locking switch (switch 3 in FIG. 21) for controlling the torque. This results in increase of the number of parts as well as more intricate wiring and assembling, causing increase of manufacturing costs. Furthermore, the structure tends to be large and consequently requires greater mounting space, so that the power tool may become larger and heavier.

SUMMARY OF THE INVENTION

It is, accordingly, an object of the present invention to provide a novel combined locking mechanism and switch which serves as both of the starting switch and the locking switch provided in the conventional device.

It is another object of the present invention to provide a compact and lightweight tool which can be manufactured at lower cost by using such a combined locking mechanism and switch.

According to the present invention, there is provided a combined locking mechanism and switch comprising a switch, an actuator for directly turning on or off the switch, a locking member shiftable between a first position in which it is disposed in opposing relation to the actuator and a second position in which it is spaced apart from the actuator, and an actuating member for actuating the actuator through the locking member only when the locking member is placed in the first position.

In the combined locking mechanism and switch, the locking member is mechanically connected to an overload sensing mechanism, so that when any overload is sensed, the locking member may be shifted from the first position to the second position. The actuating member is mechanically connected to an operating member or lever so that, when the locking member is in the first position, the actuator may be turned on or off by operation of the operating lever, and when the locking member is in the second position, the power switch is off at all times, irrespective of operation of the operating lever.

Thus, the combined locking mechanism and switch enables a power tool to have the overload cutoff feature to be controlled by a single switch, permitting reduction of manufacturing costs as well as compact and lightweight structure.

The invention will become more fully apparent from the claims and the description as it proceeds in connection with the drawings.

DETAILED DESCRIPTION OF THE PREFERRED EMBODIMENTS

Figure 1:
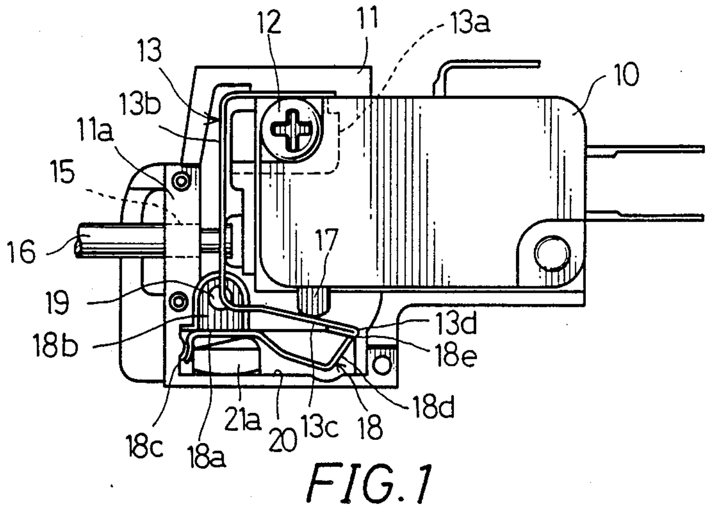
FIG. 1 is a plan view of a combined locking mechanism and switch according to a first embodiment of the invention.
Figure 2:
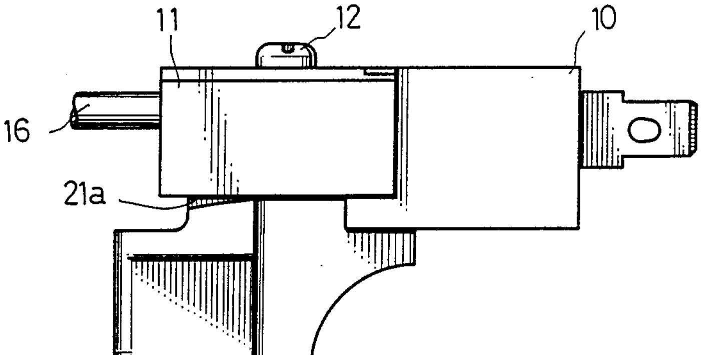
FIG. 2 is a side view of the switch shown in FIG. 1.
Figure 2:
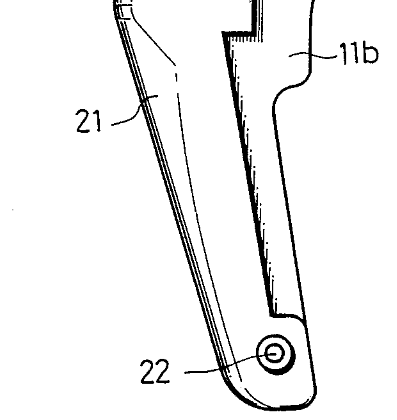
Figure 3:
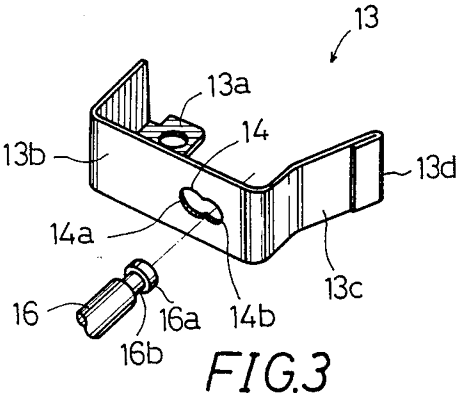
FIG. 3 is a perspective view of the leaf spring of the switch shown in FIG. 1.

Referring now to FIGS. 1 to 5, shown therein is a combined locking mechanism and switch according to a first embodiment of the present invention. As shown therein, a snap-type micro switch 10 is secured to a holder 11 made of a resin material by a bolt 12. A substantially U-shaped leaf spring 13 is provided serving as a locking member. The leaf spring 13 has a tongue portion 13*a* interposed between the micro switch 10 and the holder 11 and fixedly fastened also by the bolt 12. The leaf spring 13 may be fixed at the proximal end thereof to any other suitable portion of the micro switch 10 or the holder 11. As best shown in FIG. 3, the leaf spring 13 has a medial portion 13*b* in which is formed a double bubble-shaped mounting hole 14 having an enlarged-diameter portion 14*a* and a reduced-diameter portion 14*b*. The holder 11 has a laterally extending support piece 11*a* in which a guide slot 15 is formed for guiding an actuating shat 16 serving as an overload sensing member. The actuating shaft 16 is engaged in the hole 14 at the distal end thereof. More specifically, as shown in FIG. 3, the actuating shaft 16 has an enlarged-diameter end portion 16*a* and a reduced-diameter portion 16*b*. The enlarged-diameter end portion 16*a* is inserted through the enlarged-diameter portion 14*a* of the hole 14, until the reduced-diameter portion 16*b* is received therein, and then the reduced-diameter portion 16*b* is brought in engagement with the reduced-diameter portion 14*b* of the hole 14. As shown in FIG. 1, the micro switch 10 has an actuator 17 for finally and directly turning on and off the micro switch 10. The actuator 17 is normally urged by a spring (not shown) in its off position. The leaf spring 13 further has a free end portion 13*c* positioned in opposing relation to the actuator 17. The free end portion 13*c* terminates in a rounded bent end 13*d*.

An actuating member 18 is provided and has a flat medial portion 18*a* and a pair of legs 18*b* extending transversely from the top and bottom of the medial portion 18*a* and pivotally supported by a pin 19, so that the actuating member 18 may be pivotally mounted to the holder 11. The actuating member 18 also has a rear end 18*c* bent downwardly as seen in FIG. 1 and an L-shaped portion 18*d* terminating in a distal end 18*e* positioned in opposing relation to the free end portion 13*c* of the leaf spring 13.

An operating member or lever 21 is provided extending through a guide hole 20 formed through the holder 11. The operating lever 21 has an operating tongue 21*a* formed at the upper end thereof and adapted to abut against the back surface (lower surface as seen in FIG. 1) of the medial portion 18*a* of the actuating member 18. The holder 11 has a leg portion 11*b*, and the operating lever 21 is pivotally movably mounted on the lower end of the leg portion 11*b* by a pin 22 and is normally urged by a compression coil spring (not shown) in a direction away from the leg portion 11*b*.

Figure 4:
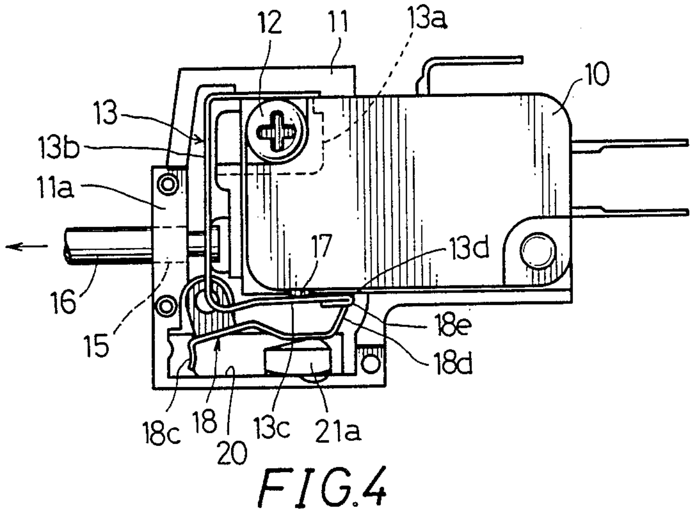
FIG. 4 is a plan view of the switch of FIG. 1 in its operative position.

When the operating lever 21 in the normal position as shown in FIGS. 1 and 2 is depressed toward the leg portion 11*b* of the holder 11, or in case of a power tool as will be mentioned later, when the operating lever 21 and the handle housing 33 are gripped together to depress the operating lever 21, the operating tongue 21*a* provided at the upper end of the operating lever 21 is guided along the guide hole 20 to the right (as viewed in FIG. 1), so that the L-shaped portion 18*d* of the actuating member 18 is pressed upwardly as shown in FIG. 4. As the result, the distal end 18*e* of the actuating member 18 pushes the free end portion 13*c* of the leaf spring 13 and thence the actuator 17 of the micro switch 10, as shown in FIG. 4, so that the micro switch 10 is turned on to rotate the motor of the power tool. When the operating lever 21 is released from depression, the operating lever 21 is automatically returned by the action of the compression coil spring, so that the operating tongue 21*a* is moved from the position shown in FIG. 4 to the left so as to press the rear end 18*c* of the actuating member 18. This produces a reaction force which causes the L-shaped portion 18*d* to be displaced downwardly from the position in FIG. 4 and consequently, the leaf spring 13 and the actuator 17 to be returned to their respective original positions through their restoring forces. Thus, the micro switch 10 is turned off as shown in FIG. 1, and the motor stops its rotation.

Figure 5:
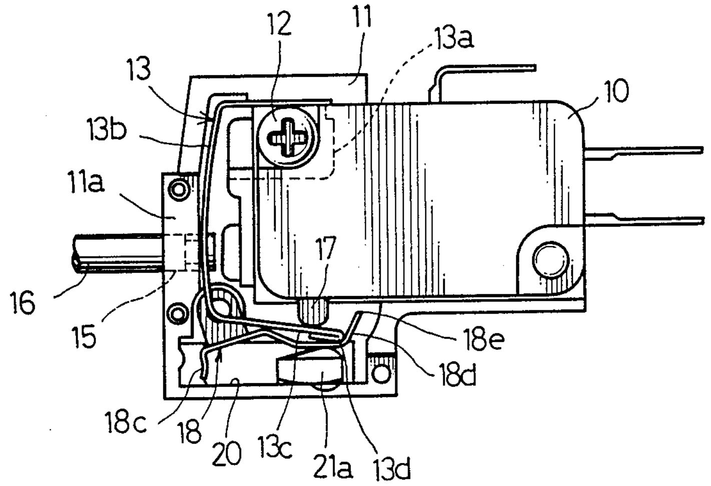
FIG. 5 is a plan view of the switch of FIG. 1 in its locked position.
Figure 6:
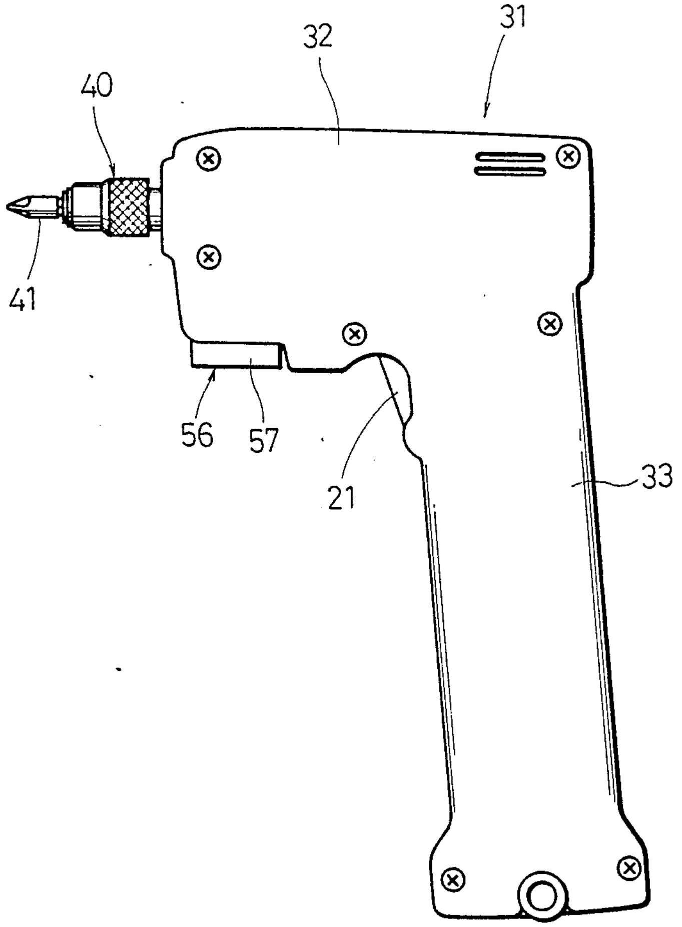
FIG. 6 is a side view of a power tool incorporating the switch of the first embodiment.

In the operative position shown in FIG. 4, if excessive torque is produced to cause the actuating shaft 16 to be drawn in a direction away from the micro switch 10 in a manner as will be described later, the medial portion 13*b* of the leaf spring 13 is drawn to the left, as shown in FIG. 5, so that the distal end 13*d* of the free end portion 13*c* is disengaged from the distal end 18*e* of the actuating member 18 and thence released from the pressing force imparted by the actuating member 18. Simultaneously, the actuator 17 and the free end portion 13*c* of the leaf spring 13 are returned to their original positions through their restoring forces, so that the micro switch 10 is turned off and the motor stops its rotation. At this time, the medial portion 13*b* of the leaf spring 13 is drawn by the actuating shaft 16 into a resiliently flexed position.

In this locked condition in which the free end portion 13*c* of the leaf spring 13 is disengaged from the distal end 18*e* of the actuating member 18, any attempt to depress the operating lever 21 is ineffective and the micro switch 10 is held in its off position, so that the motor will not rotate.

When the excessive torque is removed, the actuating shaft 16 is drawn toward the micro switch 10 by the medial portion 13*b* of the leaf spring 13 through its restoring force, and simultaneously, the distal end 13*d* of the free end portion 13*c* of the leaf spring 13 is brought into press contact against the inner surface of the L-shaped portion 18*d* of the actuating member 18. In this condition, when the operating lever 21 is released from depression, it is automatically returned by the compression coil spring, so that the operating tongue 21*a* presses the rear end 18*c* of the actuating member 18. This produces a reaction force which causes the L-shaped portion 18*d* to be moved downwardly from the position in FIG. 5. As the result, the distal end 13*d* of the free end portion 13*c* of the leaf spring 13, which has been in press contact against the inner surface of the L-shaped portion 18*d* of the actuating member 18 slides along the inner surface of the L-shaped portion 18*d* of the actuating member 18, until it comes in abutment against the surface of the distal end 18*e*. Thus, the normal condition shown in FIG. 1 is restored. Before the excessive torque is removed, the operating lever 21 may be released from depression to displace the L-shaped portion 18*d* of the actuating member 18 to the position away from the micro switch 10. In this case, when the excessive torque is removed, the restoring force of the leaf spring 13 causes the free end portion 13*c* to be returned in contact with the distal end 18*e* of the actuating member 18, and thus the normal condition as shown in FIG. 1 is restored.

Referring now to FIGS. 6 to 12, shown therein and generally designated by the reference number 31 is a power tool such as a screwdriver incorporating the combined locking mechanism and switch of the first embodiment. As shown therein, the screwdriver 31 includes an integral tool housing 32 and handle housing 33. The tool housing 32 encloses an electric motor, a spindle, a gear transmission mechanism, clutch means and other components which will be mentioned later. The handle housing 33 extends downwardly from the rear bottom region of the tool housing 32 and encloses a rechargeable battery (not shown).

Figure 7:
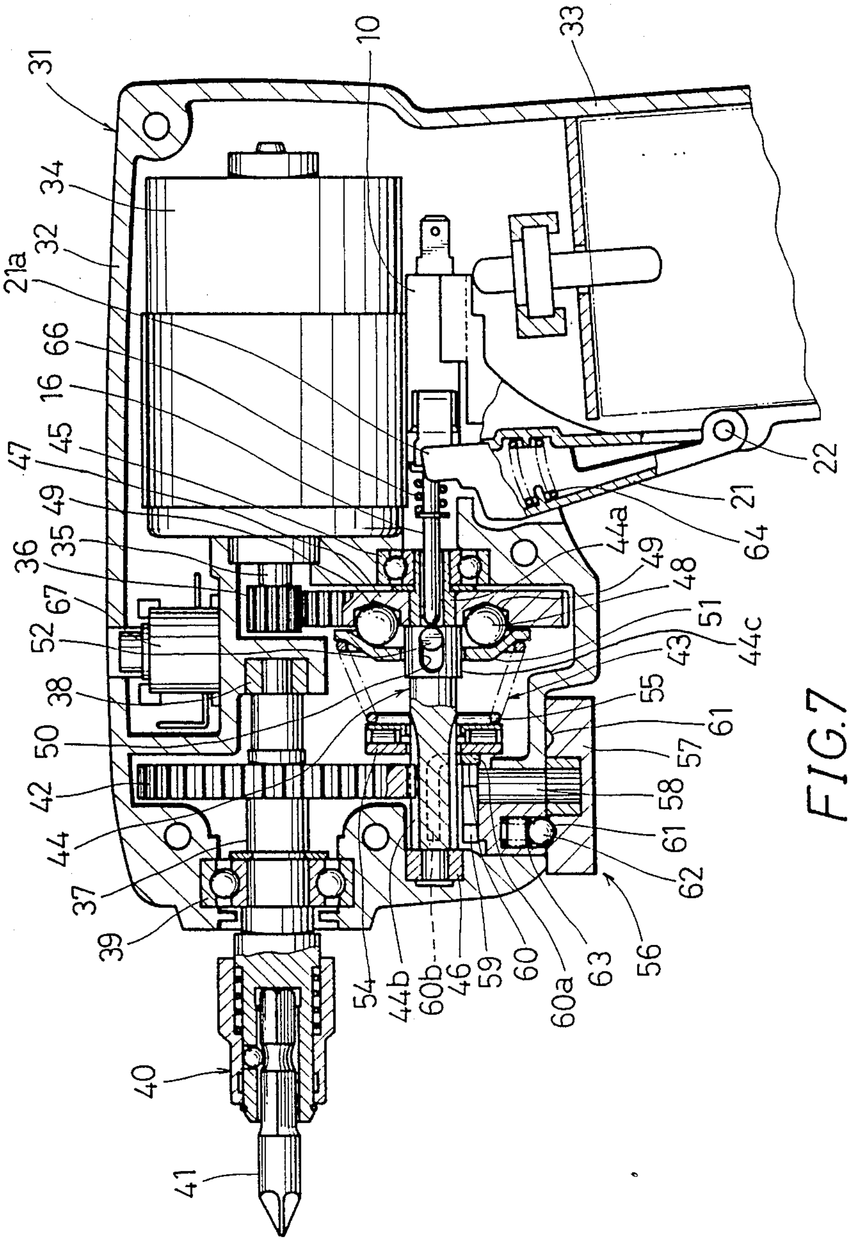
FIG. 7 is an enlarged sectional view of the power tool shown in FIG. 6, with parts broken away for clarity.

As shown in FIG. 7, a reversible electric motor 34 is mounted in the rear region of the tool housing 32 and has an output shaft 35 projecting forwardly therefrom and formed with a driving gear 36. A spindle 37 is rotatably supported through bearings 38 and 39 in the front region of the tool housing 32, and has a front end projecting forwardly of the tool housing 32 and a chuck 40 secured thereto for mounting a driver bit 41. The spindle 37 has a large-diameter driven gear 42 mounted thereon within the tool housing 32.

Clutch means 43 is provided in the front lower region of the tool housing 32 between the driving gear 36 and the driven gear 42. As shown in FIGS. 7, 8, 9 and 11, the clutch means 43 includes a clutch shaft 44, a fixed clutch disc 47, two clutch balls 48, an elongated slot 50, a movable clutch disc 51, a clutch pin 52, a spring bearing member 54, and a coil spring 55.

Figure 8:
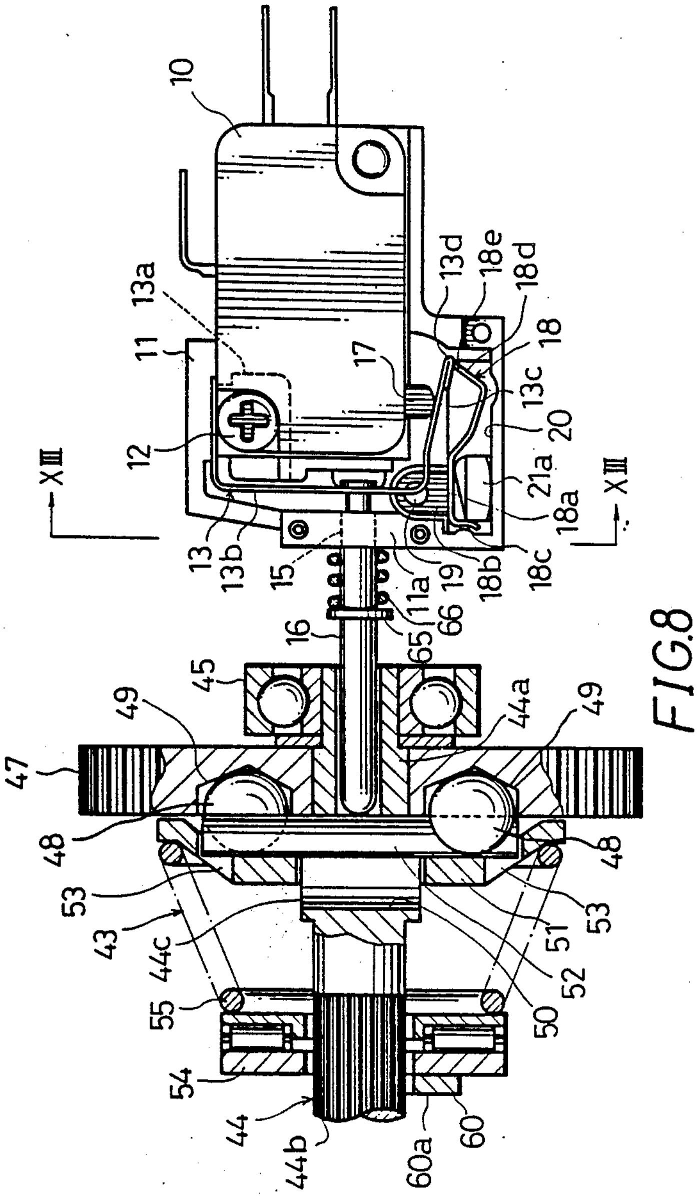
FIG. 8 is an enlarged sectional view of the essential parts of the power tool in which the operating lever is in its inoperative position and no overload is applied.
Figure 9:
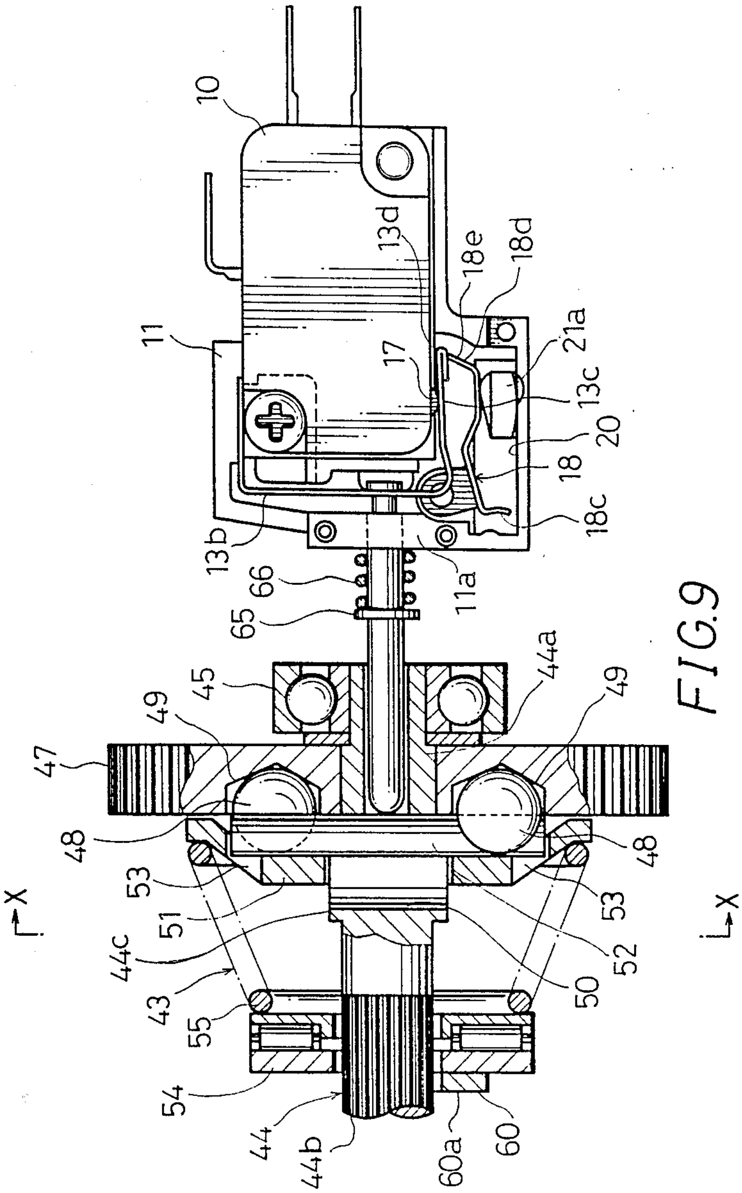
FIG. 9 is a view similar to FIG. 8 and showing the condition in which the operating lever is in its operative position and no overload is applied.
Figure 10:
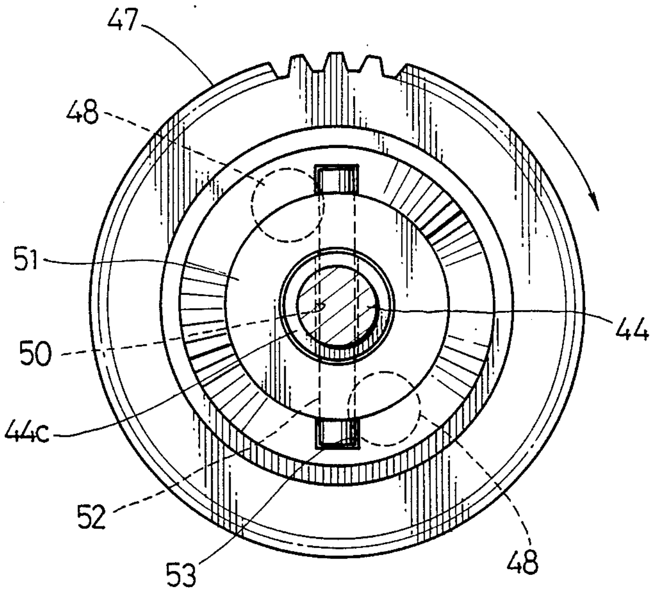
FIG. 10 is an end view taken in the direction of the arrows along the line X—X in FIG. 9 and showing a detail of the clutch means.
Figure 12:
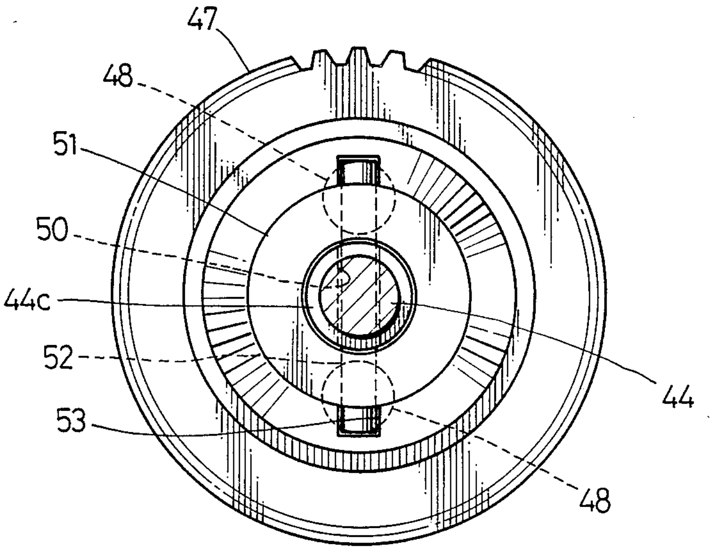
FIG. 12 is an end view taken in the direction of the arrows along the line XII—XII in FIG. 11 and showing a detail of the clutch means.
Figure 11:
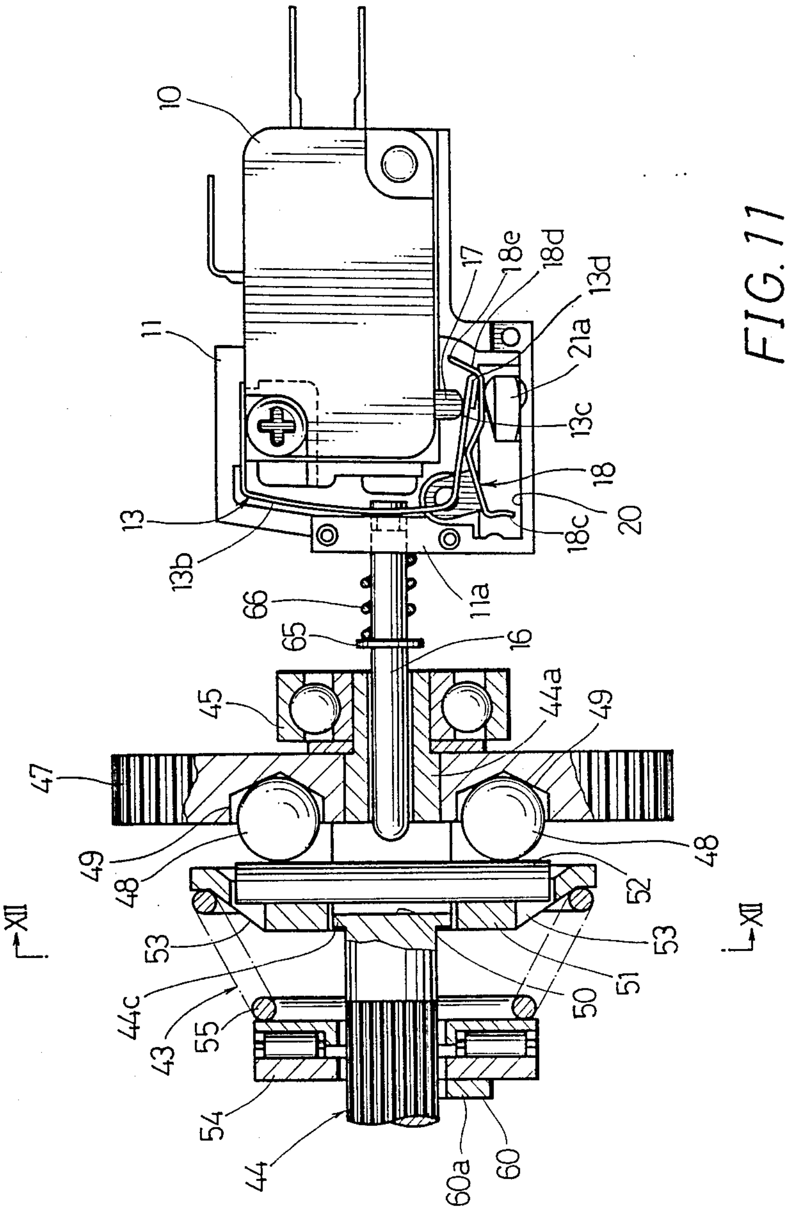
FIG. 11 is a view similar to FIG. 8 and showing the condition in which the operating lever is in its operative position and overload is applied.
Figure 13:
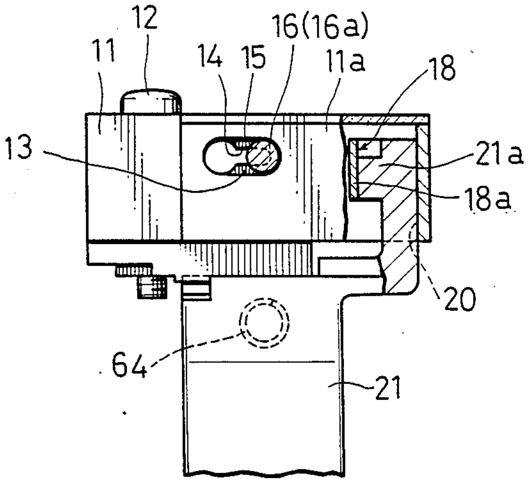
FIG. 13 is an end view, partly in cross section, along the line XIII—XIII in FIG. 8.

The clutch shaft 44 is rotatably supported in the tool housing 32 through bearings 45 and 46 and extends in parallel to the output shaft 35. The clutch shaft 44 has a hollow shaft portion 44*a* at one end thereof, a splined portion 44*b* at the other end thereof, and an enlarged-diameter portion 44*c* substantially at the intermediate portion thereof. The fixed clutch disc 47 is secured to the hollow shaft portion 44*a* of the clutch shaft 44 and has peripheral teeth normally meshed with the driving gear 36 of the output shaft 35. The splined portion 44*b* of the clutch shaft 44 is normally meshed with the driven gear 42 (FIG. 7). The clutch balls 48 are partially received with play within two opposite recesses 49 formed in an end face of the fixed clutch disc 47. The slot 50 is formed diametrically through the enlarged-diameter portion 44*c* of the clutch shaft 44 and extends a predetermined distance axially of the enlarged-diameter portion 44*c*. The movable clutch disc 51 is formed in a dish-like configuration and is axially movably fitted on the outer periphery of the enlarged-diameter portion 44*c* of the clutch shaft 44. The clutch pin 52 is loosely fitted in the slot 50 and has both ends engaged in two opposite cutouts 53 formed in an inclined face of the movable clutch disc 51 facing the clutch balls 48. The spring bearing member 54 is composed of two discs with a thrust bearing interposed therebetween and is axially movably fitted on the outer periphery of the rear end of the splined portion 44*b* of the clutch shaft 44. The coil spring 55 is disposed in compression between the spring bearing member 54 and the movable clutch disc 51 and is adapted for normally urging the movable clutch disc 51 so as to engage the clutch pin 52 with the clutch balls 48. Thus, a torque transmitting mechanism is constructed by the output shaft 35 of the electric motor 34, the driving gear 36, the clutch means 43, the driven gear 42, the spindle 37 and other components. Specifically, rotation of the output shaft 35 of the electric motor 34 in either forward or reverse direction is transmitted from the driving gear 36 and the fixed clutch disc 47 through engagement between the clutch balls 48 and the clutch pin 52 of the movable clutch disc 51 to the clutch shaft 44 (FIGS. 8, 9 and 10). As this occurs, the spindle 37 is rotated in the forward or reverse direction through engagement between the splined portion 44*b* of the clutch shaft 44 and the driven gear 42. In case overload is imposed on the spindle 37 to impede rotation thereof, rotation of associated parts of the clutch shaft 44 is impeded, causing the clutch balls 48 in the fixed clutch disc 47 rotated with the output shaft 35 of the electric motor 34 to strike on the outer periphery of the clutch pin 52 (FIGS. 11 and 12). As the result, the clutch pin 52 and the movable clutch disc 51 are moved axially of the clutch shaft 44 (to the left from the position in FIGS. 7, 8 and 9) against the biasing force of the coil spring 55, so that the engagement is intermittently released to interrupt transmission of rotation from the motor 34.

As shown in FIG. 7, adjusting means 56 is provided in the front lower region of the tool housing 32 to adjust the biasing force of the clutch means 43. The adjusting means 56 includes an adjusting knob 57, an adjusting shaft 58, an adjusting plate 59, and an L-shaped abutting member 60.

The adjusting shaft 58 is rotatably supported in the tool housing 32 and has one end projecting out of the tool housing 32 for carrying the adjusting knob 57 and the other end facing the splined portion 44*b* of the clutch shaft 44. The adjusting plate 59 is eccentrically attached to the other end of the adjusting shaft 58 and has a peripheral cam face so formed as to steppingly change the distance from the axis of the adjusting shaft 58. The L-shaped abutting member 60 has a shorter leg 60*a* inserted in abutment between the outer periphery of the adjusting plate 59 and the end face of the spring bearing member 54 and has forked longer legs 60*b* (only one of which is shown in FIG. 7) extending axially of the splined portion 44*b* of the clutch shaft 44 along the outer periphery thereof. With this arrangement of the adjusting means 56, as the adjusting shaft 58 is rotated by the adjusting knob 57, the adjusting plate 59 changes its engaging portion (the cam face so formed as to steppingly change the distance from the axis of the adjusting shaft 58) with the abutting member 60, so that the spring bearing member 54 is shifted axially of the clutch shaft 44 to adjust the biasing force of the coil spring 55 to be imposed on the clutch means 43 or to accommodate the maximum load acting on the spindle 37.

The adjusting knowb 57 has on the back side thereof a plurality of recesses 61 (two of which are shown in FIG. 7) circumferentially arranged at positions corresponding to respective adjusting steps of the adjusting plate 59. The tool housing 32 is provided at a position opposite to one of the recesses 61 with a locking ball 62 urged by a spring 63 to project outwardly thereof, so that a portion of the locking ball 62 may be engaged in the recess 61 to lock the adjusting knob 57 and the adjusting shaft 58 against rotation relative to the tool housing 32.

As shown in FIGS. 8 to 13, the holder 11 for the micro switch 10 is mounted in the boundary between the tool housing 32 and the handle housing 33, and has mounted thereon the combined locking mechanism and switch illustrated in FIGS. 1 to 5.

As shown in FIG. 7, in the boundary between the tool housing 32 and the handle housing 33, the operating lever 21 is pivotally supported at the lower end thereof by the pin 22 and is adapted to operate the micro switch 10. The operating lever 21 is normally urged by a compression coil spring 64 in the counterclockwise direction (as viewed in FIG. 7) or the direction opposite to depression. The upper portion of the operating lever 21 is loosely inserted into the guide hole 20 formed in the holder 11. The operating lever 21 is also provided at the upper end thereof with the operating tongue 21*a* projecting inwardly to be engaged against the outside face of the actuating member 18. With this arrangement of the operating lever 21, the operating tongue 21*a* is normally in abutment against the medial portion 18*a* and the rear end portion 18*c* of the actuating member 18 and in this condition, the actuator 17 of the micro switch 10 is off (FIG. 8). When the operating lever 21 is depressed and moved pivotally, the operating tongue 21*a* is moved from the medial portion 18*a* through the L-shaped portion 18*d* of the actuating member 18 to the upper right (as viewed in FIG. 8), causing inward movement of the actuating member 18. As this occurs, the free end portion 13*c* of the leaf spring 13 is inwardly displaced against the spring force thereof, so that the actuator 17 of the micro switch 10 is displaced to the on condition (FIG. 9).

As shown in FIGS. 7, 8, 9, 11 and 13, the actuating shaft 16 has a length portion extending from substantially the medial portion to the front end and inserted in the hollow shaft portion 44*a* of the clutch shaft 44, with the front end held in abutment against the clutch pin 52 of the clutch means 43, and the rear end loosely inserted through the elongated guide slot 15 formed in the support piece 11*a* of the holder 11. The actuating shaft 16 is provided at the rear end thereof with the enlarged-diameter end portion 16*a* which is inserted through the mounting hole 14 of the leaf spring 13 to be engaged therewith. The actuating shaft 16 is also formed substantially at the medial portion thereof with a flange 65. A coil spring 66 is positioned between the flange 65 and the support piece 11*a* of the holder 11 so as to normally urge the front end of the actuating shaft 16 against the clutch pin 52. With this arrangement of the actuating shaft 16, as the clutch pin 52 is moved forward in relation to the clutch shaft 44, the actuating shaft 16 is moved foward to draw the medial portion 13*b* of the leaf spring 13, so that the actuator 17 of the micro switch 10 which has been depressed by the free end portion 13*c* of the leaf spring 13 is released to the off position (FIG. 11).

As shown in FIG. 7, a change-over switch 67 is provided in the front upper portion of the tool housing 32 and is accessible from outside for changing the rotation of the electric motor 34 in either forward or reverse direction.

Figure 14:
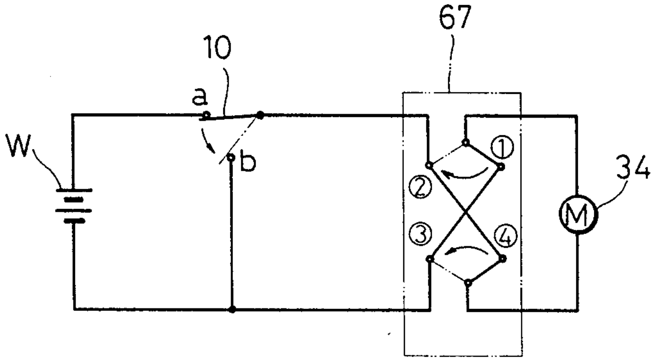
FIG. 14 is a circuit diagram of the switch of the first embodiment.

FIG. 14 shows a power-supply circuit in which the electric motor 34 is connected to a power source W. The power-supply circuit includes the micro switch 10 and the change-over switch 67 connected between the micro switch 10 and the electric motor 34 for changing the polarity of the electric motor 34. With this arrangement, when the micro switch 10 is turned on and connected to a contact a and the change-over switch 67 is connected as shown in solid lines, the electric motor 34 is rotated in the forward direction. On the other hand, when the connection of the change-over switch 67 is changed as shown in dotted lines, the electric motor 34 is rotated in the reverse direction. When the micro switch 10 is turned off and connected to a contact b, a dynamic braking circuit is formed in which the electric motor 34 is disconnected from the power source W.

The combined locking mechanism and switch of the present invention as described above operates as follows.

When it is desired to fasten a screw, the change-over switch 67 is initially connected as shown in the solid lines in FIG. 14 for forward rotation. The operating lever 21 is then depressed to thereby turn on the micro switch 10 (FIG. 9), as discussed previously with reference to FIGS. 1 and 4. This means that, in the power-supply circuit for the electric motor 34, when the micro switch 10 is connected to the contact a and the change-over switch 67 is connected as shown in the solid lines in FIG. 14 for forward rotation, the electric motor 34 is driven for forward rotation.

The rotation of the electric motor 34 is transmitted from the driving gear 36 and the fixed clutch disc 47 through engagement between the clutch balls 48 and the clutch pin 52 of the movable clutch disc 51 to the clutch shaft 44, causing the clutch shaft 44 to rotate. The rotation of the clutch shaft 44 is then transmitted through the splined portion 44*b* of the clutch shaft 44 and the driven gear 42 engaged therewith to the spindle 37 to rotate the same in the forward direction, so that a screw can be fastened by the driver bit 41.

When overload is imposed on the spindle 37 as the fastening of the screw is completed, rotation of the spindle 37 and associated parts of the clutch shaft 44 tends to be impeded. As this occurs, the clutch balls 48 in the fixed clutch disc 47 rotating along with the output shaft 35 of the electric motor 34 strikes on the outer periphery of the clutch pin 52 to move the clutch pin 52 and the movable clutch disc 51 forwardly in the axial direction of the clutch shaft 44 against the biasing force of the coil spring 55. Thus, the engagement between the clutch balls 48 and clutch pin 52 is released (FIGS. 11 and 12). As the clutch pin 52 and the movable clutch disc 51 are moved forward, the actuating shaft 16 under the biasing force of the coil spring 66 is moved forward to draw the medial portion **13*b* of the leaf spring 13, so that the actuator 17 of the micro switch 10 which has been held on by the free end portion 13*c* of the leaf spring 13 is released to the off condition and consequently, the micro switch 10 is turned off. Thus, power supply to the electric motor 34 is shut off and the output shaft 35 stops its rotation. In this condition, the clutch means 43 is disengaged, so that transmission of rotation from the output 35 to the spindle 37 is shut off by the clutch means 43**.

When the micro switch 10 is turned off and power supply to the electric motor 34 is shut off, the micro switch 10 is simultaneously connected to the contact b to form a short circuit (see FIG. 14) which constitutes a dynamic braking circuit for the electric motor 34, with the power source W disconnected, for applying a braking force to the electric motor 34 to prevent inertial rotation of the output shaft 35. This avoids application of excessive torque to the fastened screw.

The fastening torque can be controlled by adjusting the biasing force of the coil spring 55 of the clutch means 43. Specifically, the adjusting shaft 58 of the adjusting means 56 is rotated by the adjusting knob 57 to change the abutting position of the adjusting plate 59 against the abutting member 60 and consequently to displace the spring bearing member 54 axially of the clutch shaft 44. Thus, the biasing force of the coil spring 55 in the clutch means 43 can be adjusted.

When the medial portion **13*b* of the leaf spring 13 is drawn forward as described above, the free end portion 13*c* is consequently drawn, so that it is disengaged from the distal end 18*e* of the actuating member 18. Then, the free end portion 13*c* of the leaf spring 13 is returned to its original position by its resilient force, and the actuator 17 of the micro switch 10 is returned to its original off position, so that, irrespective of the depression of the operating lever 21, the micro switch 10** is held in its off condition.

When the operating lever 21 is released from depression, it is automatically returned through the biasing force of the spring 64, thereby returning the combined locking mechanism and switch to the original position shown in FIG. 8.

In order to loosen the screw, the change-over switch 67 is set to the reverse rotation position to make the connection as shown in the dotted lines of FIG. 14, and then, when the operating lever 21 is depressed, the micro switch 10 is turned on in the manner as described above, while the electric motor 34 is rotated in the reverse direction in contrast with the above mentioned case where the screw is to be fastened. If the screw has been firmly fastened, the clutch means 43 is disengaged in the same manner as described above in connection with the forward rotation to shut off transmission of rotation from the output shaft 35 to the spindle 37. Simultaneously therewith, the actuating shaft 16 operatively associated with the clutch means 43 and the combined locking mechanism and switch moves as described above to turn off the micro switch 10. In such a case, the adjusting knob 57 of the adjusting means 56 is controlled to set the biasing force of the coil spring 55 of the clutch means 43 to such a level that the clutch means 43 may be disengaged at the torque stronger than that for fastening. Therefore, with the clutch means 43 thus held in its engaging condition, the micro switch 10 can be held on to continuously drive the electric motor 34 for reverse rotation. The reverse rotation is transmitted, in the same manner as described above in connection with the forward rotation, from the drive gear 36 and the fixed clutch disc 47 through engagement between the clutch balls 48 and the clutch pin 52 of the movable clutch disc 51 to the clutch shaft 44, causing the clutch shaft 44 to rotate in the reverse direction. The rotation of the clutch shaft 44 is then transmitted through the splined portion **44*b* of the clutch shaft 44 and the driven gear 42 engaged therewith to the spindle 37** to rotate the same in the reverse direction, so that the screw can be loosened.

As described above, in fastening of a screw by the device of the present invention, when overload is imposed on the spindle 37 at completion of fastening of the screw, the mechanical movement of the actuating shaft 16 and the combined locking mechanism and switch resulting from the disengagement of the clutch means 43 causes the actuator 17 of the micro switch 10 to be displaced to the off position, and holds the micro switch 10 in the off position. Thus, transmission of rotation from the output shaft 35 to the spindle 37 can be positively shut off. Furthermore, as inertial rotation of the electric motor 34 can be promptly stopped, application of excessive torque to the fastened screw can be avoided, thereby improving the efficiency of operation.

Now, a second embodiment of the combined locking mechanism and switch according to the present invention will be described with reference to FIGS. 15 to 20. A snap-type micro switch 110 is secured to a holder 111 by a bolt 112. The holder 111 includes a base portion 113, a switch mounting arm 114, a slide guide 115, a spring bearing member 116, an operating lever mounting arm 117.

The micro switch 110 has a pair of mounting holes 118 and 120, and the switch mounting arm 114 has a tapped hole 119 and a through hole 121 formed with a boss 122. The bolt 112 is inserted into the mounting hole 118 of the micro switch 110 and screwed into the tapped hole 119. The boss 122 is inserted into the mounting hole 120 for positioning the switch mounting arm 114.

Figure 16:
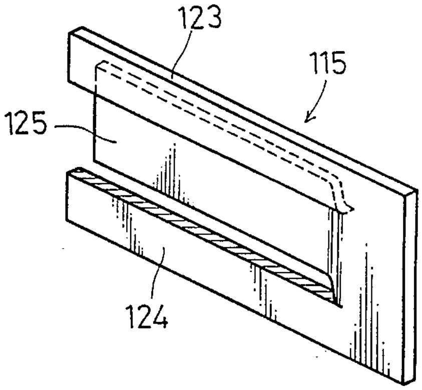
FIG. 16 is an enlarged perspective view of the slide guide of the switch shown in FIG. 15.

As shown in FIG. 16, the slide guide 115 includes upper and lower outer guide pieces 123 and 124 and a central inner guide piece 125 rising and then extending in parallel to the outer guide pieces 123 and 124. A slide piece 126 is provided and has an elongated hole 127 through which the central inner guide piece 125 is inserted, so that the slide piece 126 may be held between the outer guide pieces 123 and 124 and the inner guide piece 125. In order to achieve positive holding of the slide piece 126, projecting pieces may be formed, extending from the top of the guide piece 123 and the bottom of the guide piece 124 and bent inwardly so as to guide or receive the slide piece 126 therebetween. Alternatively, the slide piece 126 may be formed at the top and the bottom thereof with ridges to guide or receive the guide piece 125 therebetween.

Figure 15:
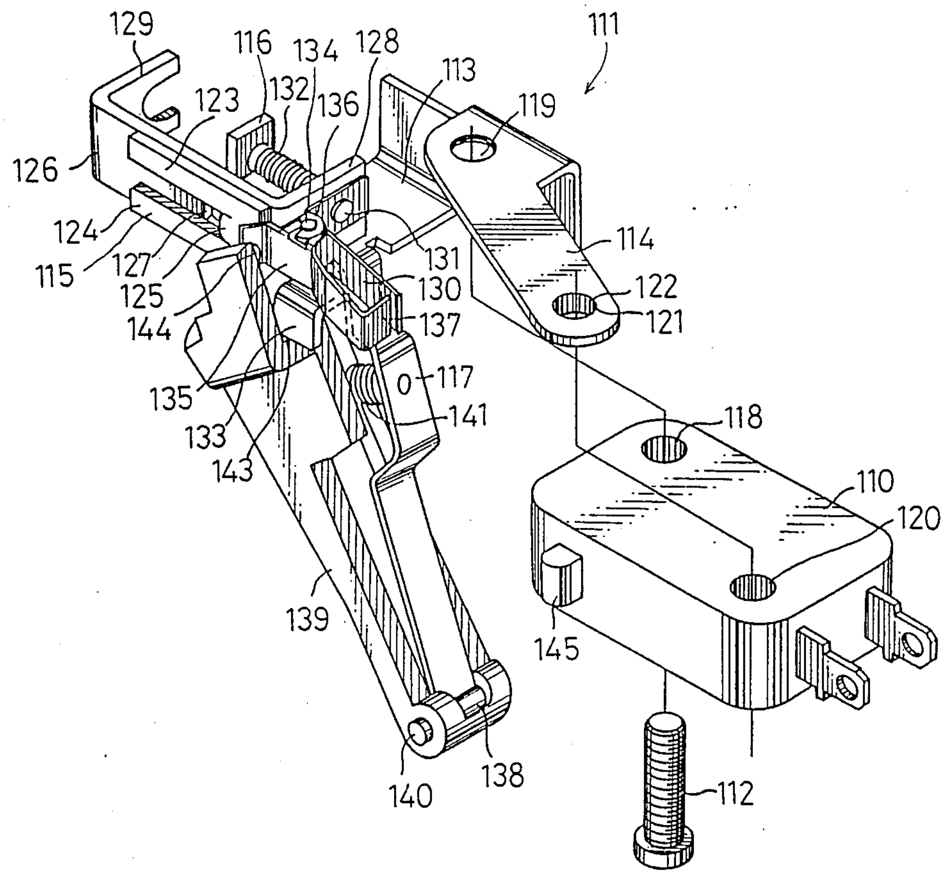
FIG. 15 is an exploded perspective view of a combined locking mechanism and switch according to a second embodiment of the invention.
Figure 17:
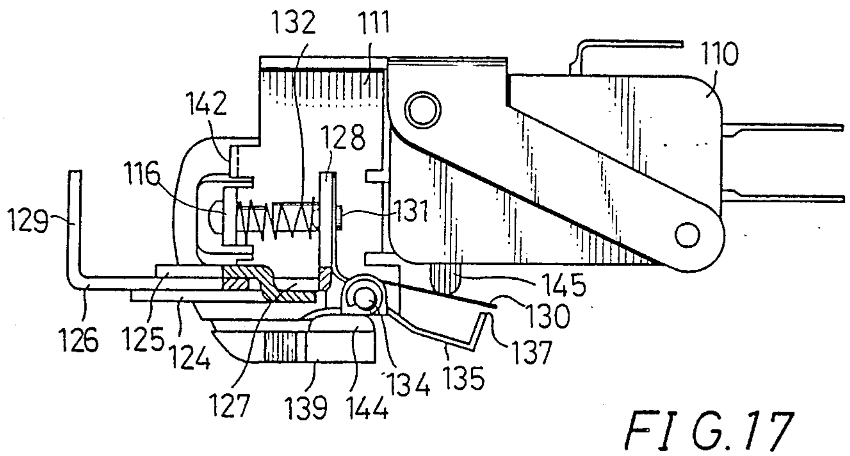
FIG. 17 is a plan view of the combined locking mechanism and switch in FIG. 15.

The slide piece 126 is a U-shaped member having both ends 128 and 129 inwardly bent substantially at right angles. An L-shaped leaf spring 130 serving as a locking member is secured at the base end thereof by a pin 131 to the outside of one end 128 of the slide piece 126 adjacent to the micro switch 110 (FIGS. 15 and 17). The pin 131 extends from the inside of the end 128, serving as a guide pin for a compression coil spring 132 positioned between the end 128 and the spring bearing member 116 of the holder 111. The other end 129 of the slide piece 126 is of a forked configuration to be connected with an actuating shaft (not shown), so that when the torque exceeds a predetermined level, the slide piece 126 may be drawn through the actuating shaft.

The holder 111 is integrally formed between the slide guide 115 and the operating lever mounting arm 117 with an operating lever guide piece 133 bent and directed downwardly. The operating lever guide piece 133 has a flat upper face from which a pin 134 extends upwardly to pivotally movably support an actuating member 135. An E-ring 136 is fitted to prevent falling off of the actuating member 135 from the pin 134.

As best shown in FIG. 17, the actuating member 135 has a front end portion and a rear end portion extending downwardly (as seen in FIG. 17) from the pivot point. The front end portion is inwardly bent substantially at right angles, and the rear end portion has a distal end 137 disposed in opposed relation to the distal end of the leaf spring 130.

Figure 18:
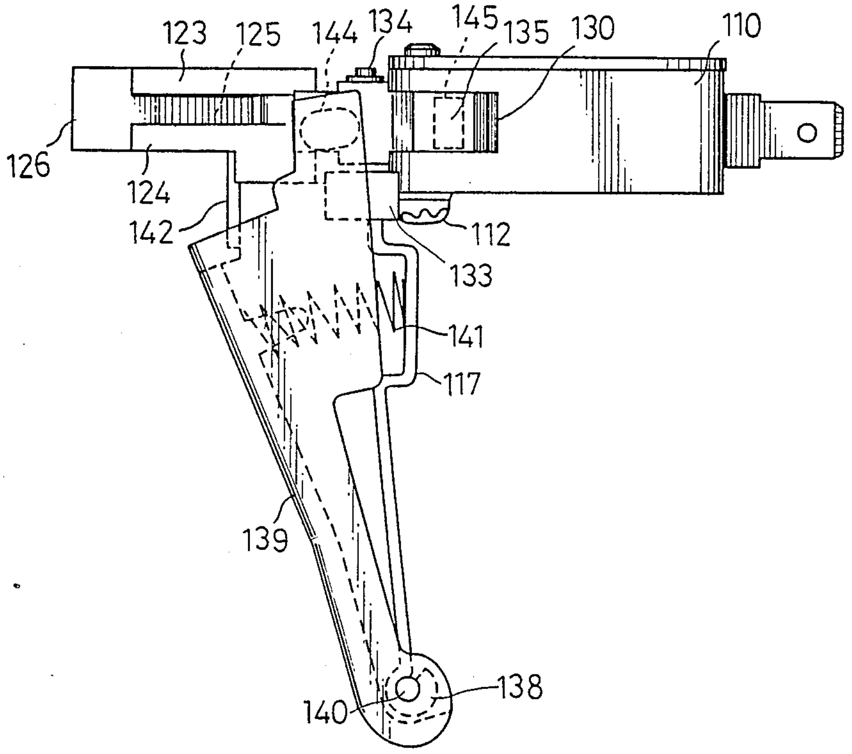
FIG. 18 is a side view of the switch shown in FIG. 15.

The operating lever mounting arm 117 is formed at the lower end thereof with a cylindrically rounded bearing portion 138 through which an operating member or lever 139 is pivotally movably supported by a pin 140. A compression coil spring 141 is positioned between the mounting arm 117 and the operating lever 139 at the respective intermediate positions so as to urge the operating lever 139 in a direction away from the mounting arm 117. The urging force is limited by abutment of the upper portion of the operating lever 139 against a stopper piece 142 formed by bending a portion of the holder 111 (FIGS. 17 and 18). The operating lever 139 is formed at the upper portion thereof with a guide groove 143 in which the operating lever guide piece 133 is fitted so that the swinging movement of the operating lever 139 may be guided. The operating lever 139 has an operating piece 144 formed in the inside of the upper portion thereof and adapted to be slidingly moved in engagement with the back side of the actuating member 135.

As shown in FIG. 17, when the micro switch 110 is assembled to the holder 111, the leaf spring 130 is urged by the coil spring 132 toward the micro switch 110, so that it is located over and in opposing relation to an actuator 145 of the micro switch 110, with the distal end of the leaf spring 130 disposed in opposing relation to the distal end 137 of the actuating member 135. This condition in which the slide piece 126 is urged by the coil spring 132 toward the micro switch 110 and the leaf spring 130 is in a first position opposing to the distal end 137 of the actuating member 135 is the normal condition of the combined locking mechanism and switch.

Figure 19:
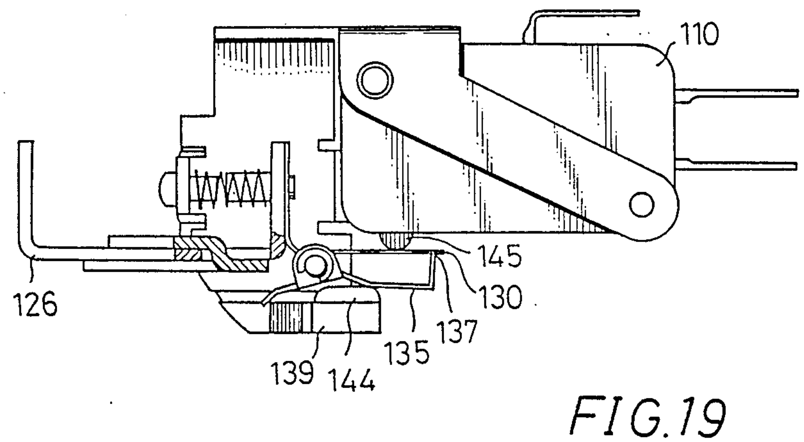
FIG. 19 is a view similar to FIG. 17 and showing the locing member of the switch in its first position.

When the operating lever 139 in the normal position is pressed toward the micro switch 110 as shown in FIG. 19, or in case of the power tool when the operating lever 139 and the handle housing are gripped together to depress the operating lever 139, the operating piece 144 at the upper portion of the operating lever 139 presses the front end portion of the actuating member 135, so that the actuator 145 of the micro switch 110 is depressed through the leaf spring 130 to turn on the micro switch 110, causing the motor to rotate.

Figure 20:
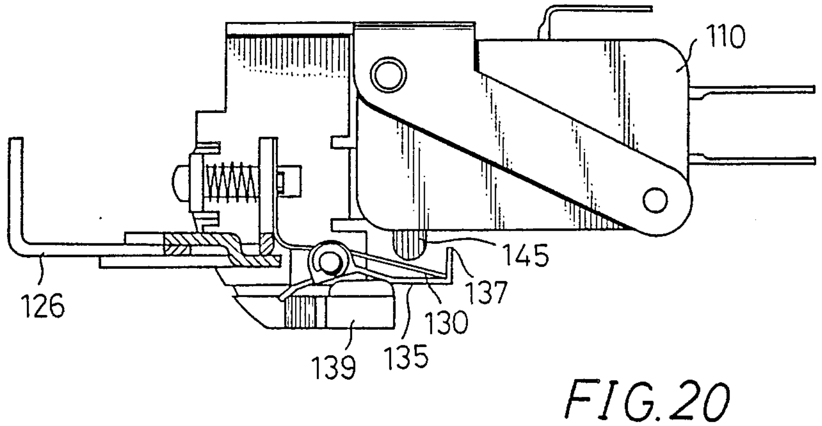
FIG. 20 is a view similar to FIG. 17 and showing the locking member in its second position.
Figure 21:
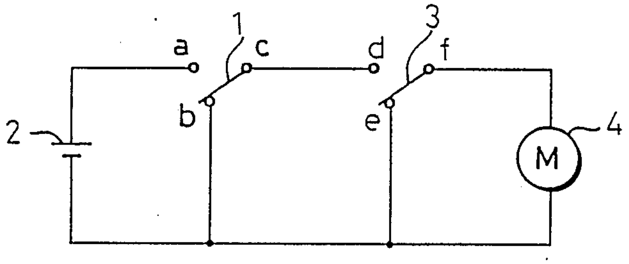
FIG. 21 PRIOR ART
FIG. 21 is a circuit diagram of a prior art power tool including a starting switch and a locking switch.

In this operative position, if excessive torque is produced to cause the slide piece 126 to the drawn in a direction away from the micro switch 110, the leaf spring 130 is shifted to a second position in which it is disengaged from the distal end 137 of the actuating member 135, as shown in FIG. 20, and is consequently released from the pressing force imparted by the actuating member 135. Simultaneously, the actuator 145 is returned to its original position through its restoring force so that the micro switch 110 is turned off and the motor stops its rotation.

In this locked condition in which the leaf spring 130 is disengaged from the distal end 137 of the actuating member 135, any attempt to depress the operating lever 139 is ineffective and the micro switch 110 is held in its off position, so that the motor will not rotate. Even if the excessive torque is removed, the micro switch 110 can be turned on only when the operating lever 139 is once released from depression to position the leaf spring 130 in opposing relation to the distal end 137 of the actuating member 135 and is depressed again. Thus, unexpected rotation of the motor can be prevented.

It can be appreciated that modifications may be made in the commbined locking mechanism and switch of the second embodiment. For example, the locking member may be any suitable member other than the leaf spring 130, and the means for displacing the leaft spring 130 form the first position to the second position may be any suitable means such as a linkage other than the slide piece 126. The operating lever 139 serving as the operating member may be replaced by an operating push button. In addition, the actuating member 135 may be omitted, so that the operating member may directly press the actuating member through the locking member. Further, various types of actuators are suitable for the micro switch.

The combined locking mechanism and switch of the second embodiment can be mounted on the power tool by the same structure as described in connection with the first embodiment.

While the invention has been described with reference to preferred embodiments thereof, it is to be understood that modifications or variations may be easily made without departing from the scope of the invention which is defined by the appended claims.

What is claimed is:

1. A power tool comprising:

a tool housing;

an electric motor enclosed in said tool housing;

a chuck projecting out of said tool housing;

a torque transmission mechanism for transmitting torque from said electric motor to said chuck;

an operating member mounted on said tool housing and adapted to be operated by an operator;

a switch having an actuator and connected to said electric motor so that when said actuator is in its own position, driving current may flow to said electric motor, and when said actuator is in its off position, driving current may not flow to said electric motor;

an overload sensing member mechanically connected to said torque transmission mechanism, said overload sensing member being shiftable when torque above a predetermined level is produced between said electric motor and said chuck;

a locking member mechanically connected to said overload sensing member, said locking member being normally in a first position in which said locking member is located in a path of movement of said actuator, said locking member being shiftable, as said overload sensing member is shifted, to a second position in which said locking member is located out of the path of movement of said actuator; and an actuating member disposed in opposing relation to said actuator with said locking member interposed therebetween, so that when said locking member is in the first position, said actuating member may be moved by operation of said operating member to shift said actuator to its on position through said locking member, and when said locking member is shifted to the second position, said locking member being disengaged from said actuator to cause said actuator to move to its off position.

2. The power tool as defined in claim 1 wherein said actuating member has a substantially L-shaped end portion which is movable toward said actuator as said operating member is operated and wherein said locking member is in the form of a sheet metal and is disposed in opposing relation to said actuator, said locking member abutting against said L-shaped end portion of said actuating member when said locking member is located in the first position, and said locking member being spaced away from said L-shaped end portion of said actuating member when said locking member is located in the second position.

3. The power tool as defined in claim 1 wherein said torque transmission mechanism includes clutch means including a first clutch member which is movable relative to said tool housing and a second clutch member which is immovable relative to said tool housing, said first and second clutch members being moved away from each other when torque above a predetermined level is transmitted, and wherein said overload sensing member is mechanically connected to said first clutch member.

4. The power tool as defined in claim 1 wherein said actuating member has a substantially L-shaped end portion, and wherein said locking member is a substantially L-shaped leaf spring having one side mechanically connected to said overload sensing member, said locking member having a free end portion adapted to abut against the distal end of the L-shaped end portion of said actuating member when said locking member is in its first position, and said locking member being resiliently flexed by displacement of said overload sensing member, causing the distal end of the free end portion thereof to come in contact with the inside of the corner of said L-shaped end portion of said actuating member.

5. The power tool as defined in claim 1 wherein said actuating member has a substantially L-shaped end portion, and wherein said locking member is in the form of a sheet metal, said locking member having one end mechanically connected to said overload sensing member and the other end adapted to abut against the distal end of said L-shaped end portion of said actuating member when said locking member is in the first position, said locking member being slidable, as said overload sensing member is displaced, causing the other end to be disengaged from the distal end of said L-shaped end portion.

6. A combined locking mechanism and switch comprising:

a switch;

an actuator for directly turning on or off said switch through reciprocating movement thereof;

an actuating member having a portion thereof reciprocally movable in the reciprocating direction of said actuator, the reciprocating path of said actuating member portion being substantially parallel to the reciprocating path of said actuator; and a locking member shiftable between a first position in which it abuts on said actuator and said portion of said actuating member to transmit the movement of said actuating member portion to said actuator and a second portion in which it is spaced aparat from said portion of said actuating member and ineffective to transmit movement of said actuating member portion to said actuator, said locking member being normally biased in the first position and shifted to the second portion upon application of a predetermined external force thereto;

whereby when said actuating member portion is reciprocated with said locking member in the first position where no external force acts thereon, said actuator is displaced to actuate said switch, and when said locking member is brought to the second position upon application of the predetermined external force thereto, said actuator is displaced independently of said actuating member.

7. The combined locking mechanism and switch as defined in claim 6 further comprising:

a holder for holding said switch;

said locking member having a base portion fixed to said switch or said holder, a free end portion disposed in opposing relation to said actuator and a medial portion;

an overload sensing member connected to said medial portion;

said actuating member pivotally movably mounted on said holder, said reciprocally movable portion of said actuating member comprising a distal end on said actuating member normally disposed in opposing relation to the free end portion of said locking member, the distal end of said actuating member being disengaged from the free end portion of said locking member when said locking member is drawn by said overload sensing member; and an operating member adapted to press the distal end of said actuating member.

8. The combined locking mechanism and switch as defined in claim 6 further comprising:

a holder for holding said switch;

a slide piece slidingly movably attached to said holder;

said locking member comprising a plate member attached to said slide piece so as to be disposed in opposing relation to said actuator;

a coil spring for urging slide piece toward said switch;

said actuating member pivotally movably mounted on said holder, said reciprocally movable portion of said actuating member comprising a distal end normally disposed in opposing relation to said plate member, the distal end of said actuating member being disengaged from said plate member when said slide piece is drawn against the biasing force of said coil spring; and an operating member adapted to press the distal end of said actuating member.

* * * * *

UNITED STATES PATENT AND TRADEMARK OFFICE
CERTIFICATE OF CORRECTION

PATENT NO. : 4,934,494

DATED : June 19, 1990

INVENTOR(S) : Fusao Fushiya et al

It is certified that error appears in the above-identified patent and that said Letters Patent is hereby corrected as shown below:

Column 12, line 51, "own" should be -- on --.

Column 14, line 8, "aparat" should be -- apart --.

Signed and Sealed this

Seventeenth Day of December, 1991

*Attest:*

HARRY F. MANBECK, JR.

*Attesting Officer* *Commissioner of Patents and Trademarks*